(12) United States Patent
Feddes

(10) Patent No.: US 8,994,733 B2
(45) Date of Patent: Mar. 31, 2015

(54) CLOCK-WISE REPRESENTATION OF INFORMATION

(75) Inventor: Baastian Feddes, Bilthoven (NL)

(73) Assignee: Koninklijke Philips N.V., Eindhoven (NL)

( * ) Notice: Subject to any disclaimer, the term of this patent is extended or adjusted under 35 U.S.C. 154(b) by 273 days.

(21) Appl. No.: 13/449,404

(22) Filed: Apr. 18, 2012

(65) Prior Publication Data

US 2012/0320079 A1    Dec. 20, 2012

Related U.S. Application Data

(60) Provisional application No. 61/479,167, filed on Apr. 26, 2011.

(51) Int. Cl.
*G06T 11/20* (2006.01)
(52) U.S. Cl.
CPC .......... *G06T 11/206* (2013.01); *G09G 2380/08* (2013.01)
USPC .......................................................... 345/440
(58) Field of Classification Search
CPC ........ G09G 5/04; G09G 5/06; G09G 2380/08
USPC ................................................ 345/440–443
See application file for complete search history.

(56) References Cited

U.S. PATENT DOCUMENTS

| 3,558,865 | A  | * | 1/1971 | Berndt et al. ................. | 345/440 |
| 7,546,213 | B1 | * | 6/2009 | Skovenborg et al. ........... | 702/48 |
| 8,230,355 | B1 | * | 7/2012 | Bauermeister et al. ........ | 715/765 |
| 2009/0141593 | A1 | * | 6/2009 | Taha ............................... | 368/10 |
| 2011/0201911 | A1 | * | 8/2011 | Johnson et al. ............... | 600/365 |

OTHER PUBLICATIONS

Environmental Systems Research Institute, Introducing ArcGIS Tracking Analyst and ArcIMS Tracking Server, http://www.esri.com/news/arcnews/summer02articles/introducing-arcgis-ta.html, retrieved from Internet Archive on Sep. 22, 2002.*

* cited by examiner

*Primary Examiner* — Charles Tseng

(57) ABSTRACT

A system intuitively displays medical data of a patient. The system includes a display and one or more processors. The processors are programmed to receive medical data for the patient. The medical data includes one or more medical values for one or more parameters affecting the health or well-being of the patient. The processors are further programmed to display a clock-like face on the display and display the medical values on the display overlaid on the clock-like face. Time for a medical value is represented as a position around a center of the clock-like face, and magnitude for a medical value is represented as deviation from the center of the clock-like face.

19 Claims, 7 Drawing Sheets

| Score | 3 | 2 | 1 | 0 | 1 | 2 | 3 |
|---|---|---|---|---|---|---|---|
| Heart Rate (/min) | | <40 | 40-50 | 51-100 | 101-110 | 111-130 | 131-150 |
| Blood Pressure (mmHg) | <70 | 70-80 | 81-100 | 101-200 | | >200 | |
| Respiration Rate (/min) | <8 | | | 9-16 | 17-20 | | 21-30 |
| Temperature | | <35.0 | 35.0-36.5 | 36.6-37.5 | 37.6-39.0 | >39.0 | |
| Consciousness | | | | A | V | | P |
| Oxygen saturation (%) | | | | >94 | 90-94 | | 88-90 |
| Lactate (mmol/l) | | | | <1.1 | 1.2-2.0 | 2.1-3.0 | 3.1- 4.0 |

CLOCK-WISE REPRESENTATION OF INFORMATION

CROSS REFERENCE TO RELATED APPLICATIONS

This application claims the benefit of U.S. provisional application Ser. No. 61/479,167 filed Apr. 26, 2011, which is incorporated herein by reference.

The present application relates generally to the display of data. It finds particular application in conjunction with the display of medical data and will be described with particular reference thereto. However, it is to be understood that it also finds application in other usage scenarios, and is not necessarily limited to the aforementioned application.

Patients in a general ward are generally spot checked every 4-8 hours using, for example, an abnormality scoring system, such as Early Warning Score (EWS) or Modified EWS (MEWS) scoring systems. However, spot checking every 4-8 hours can be insufficient to safeguard patients experiencing a gradual decline over the course of many hours. Late discovery of deterioration can lead to unnecessary complications, intensive care unit (ICU) admission, cardiac arrest, death, and so on.

To aid in the detection of patient deterioration, systems for continuously monitoring patients are poised to play an increasing role in the future. However, one challenge with continuous monitoring is the large volume of data (e.g., respiration rates, heart rates, and so on) generated by such systems. This large volume of data can be overwhelming for clinical staffs.

One solution to this challenge is the so called "black box approach" in which clinical staff aren't provided access to the collected data. Rather, clinical staff are simply provided with alarms when vital signs deviate from acceptable limits. However, such systems are unpopular because clinical staff tend to feel that they are no longer in control of the system. Therefore it is preferable for systems to represent collected data in an insightful manner.

Known approaches to representing collected data graph the data with time along the x-axis. However, such approaches are not always easy to interpret and require a lot of screen space. Further, such approaches require reading and interpreting the time axis and converting it to a meaningful assessment of the physiological state of the patient.

Another challenge with the foregoing approaches for displaying collected information is that some medical personnel are not skilled in evaluating complicated graphs or tables. Therefore collected data is often displayed by the absolute numbers of the moment. However, this neglects trends that often contain relevant data. Further, displaying absolute numbers does not allow for easy comparison between earlier periods, for example, 24 hours ago.

The present application provides a new and improved systems and methods which overcome the above-referenced problems and others.

In accordance with one aspect, a system for intuitively displaying medical data of a patient is provided. The system includes a display and one or more processors. The processors are programmed to receive medical data for the patient. The medical data includes one or more medical values for one or more parameters affecting the health or wellbeing of the patient. The processors are further programmed to display the medical values on the display in which time is represented around a center and magnitude for a value is represented as deviation from the center.

In accordance with another aspect, a method for intuitively displaying medical data of a patient is provided. Medical data for the patient is received. The medical data includes one or more medical values for one or more parameters affecting the health or wellbeing of the patient. The medical values are displayed on a display in which time is represented around a center and magnitude for a value is represented as deviation from the center.

In accordance with another aspect, an intuitive display of medical data of a patient, including a video display, is provided. The video display includes a center and medical data for the patient. The medical data includes one or more medical values for one or more parameters affecting the health or wellbeing of the patient. Time for the medical values is represented around the center and magnitude for the medical value is represented as deviation from the center.

One advantage is that medical data, including vital sign measurements, are intuitively represented.

Another advantage is that trends for medical data can be visualized.

Another advantage is that medical data for different periods can be compared.

Another advantage is that medical data is displayed compactly.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 1:
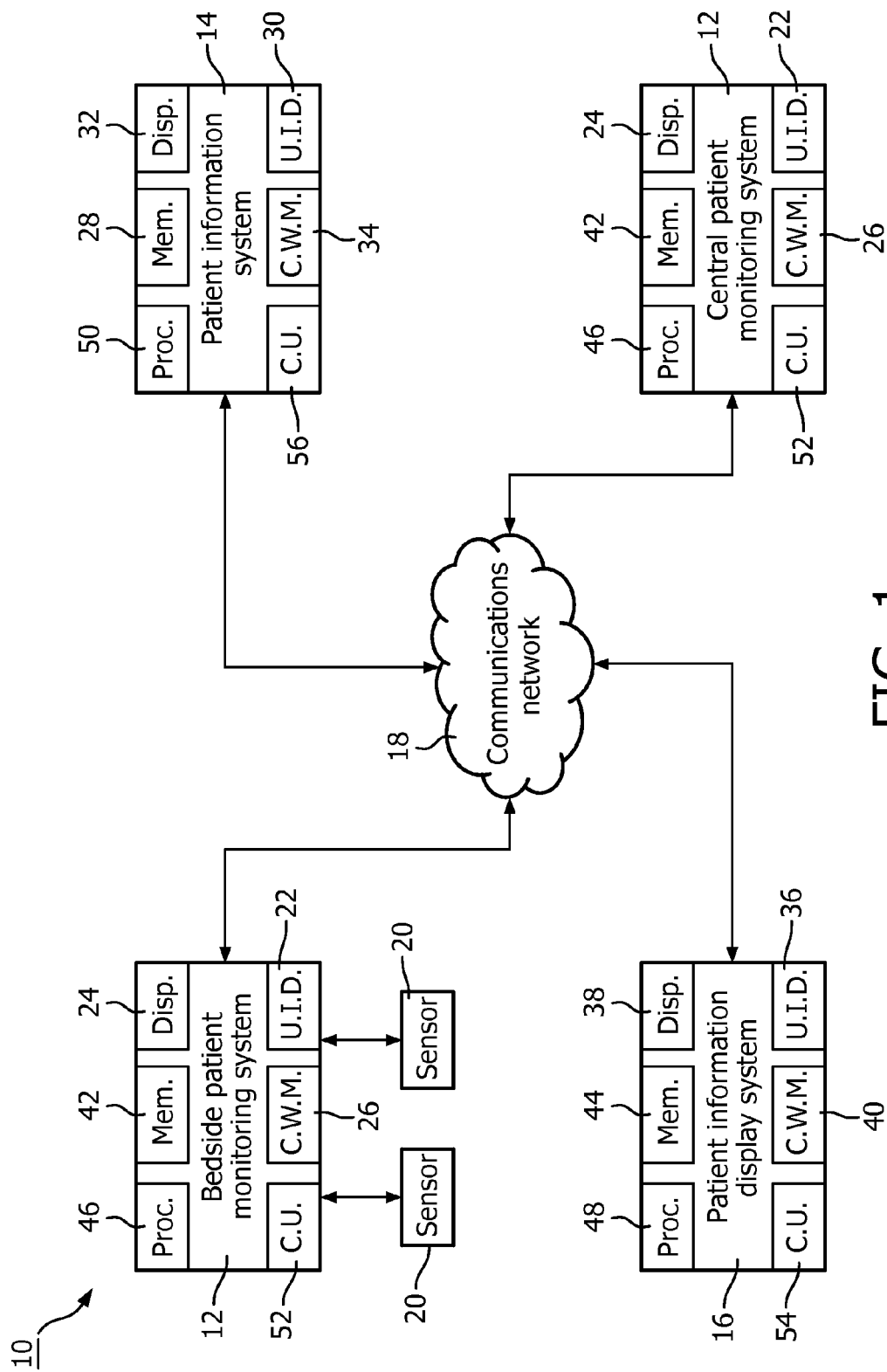
FIG. 1 is a block diagram of an IT infrastructure according to aspects of the present disclosure.

With reference to FIG. 1, an information technology (IT) infrastructure 10 of a medical institution includes one or more patient monitoring systems 12, a patient information system 14, one or more patient information display systems 16, and the like, interconnected via a communications network 18. It is contemplated that the communications network 18 includes one or more of the Internet, a local area network, a wide area network, a wireless network, a wired network, a cellular network, a data bus, and the like.

The patient monitoring systems 12 monitor one or more patients (not shown) for abnormal conditions and/or deterioration. Typically, the patient monitoring systems 12 include one or more of patient wearable patient monitors, bed-side patient monitors, central patient monitors, and so on. To facilitate the monitoring of patients, the patient monitoring systems 12 receive medical data. The medical data includes time-specific values for one or more parameters affecting the health or wellbeing of the patients. Parameters include, for example, abnormality scoring systems, alarming scoring systems, vital signs, sleep quality, remobilization patterns, level of activity, bed-leave patterns, and so on. Vital signs include, for example, blood pressure, heart rate, respiration rate, temperature, blood oxygen saturation, level of consciousness, pain, urine output, and so on. Abnormality scoring systems include, for example, EWS and MEWS.

Typically, the patient monitoring systems 12 receive the medical data automatically via, for example, one or more sensors 20, such as electrocardiographic (ECG) electrodes, blood pressure sensors, SpO$_2$ sensors, pulse sensors, thermometers, respiratory sensors, exhaled gas sensors, noninvasive blood pressure (NBP) sensors, and so on and/or from other components of the IT infrastructure 10, such as lab equipment or other patient monitoring systems. However, the patient monitoring systems 12 can receive medical data manually from clinicians via, for example, one or more user input devices 22. In certain embodiments, where the medical data is received from the user input devices 22, one or more displays 24 can be employed to facilitate such user input. Further, regardless of the source of the medical data, the patient monitoring systems 12 typically receive the medical data continuously. However, the patient monitoring systems 12 can alternatively receive medical data upon the occurrence of an event, such as a timer event, a user input event, and so on.

In certain embodiments, the patient monitoring systems 12 further display the medical data on the displays 24 using one or more clock-wise modules 26. The clock-wise modules 26 perform a method 100, hereafter described in connection with FIG. 2, to intuitively represent the medical data of a patient on the displays 24. By way of overview, the medical data is plotted on one or more clock faces. Time for a value is represented as the position around the center of the clock face, and magnitude for a value is represented as its deviation from the center of the clock face. In certain embodiments, it is contemplated that the medical data is plotted on the clock faces as it is received.

The patient information system 14, such as a central record medical database, acts as a central repository of patient information, such as electronic medical records (EMRs) and/or medical data. The patient information system 14 receives and stores the EMRs and/or the medical data for the patients in one or more memories 28. Typically the EMRs and/or the medical data are received from components of the IT infrastructure 10 via, for example, the communications network 18. However, the EMRs and/or the medical data can be manually entered via a user input device 30, optionally with the aid of a user interface presented via a display 32.

The patient information system 14 further allows components of the IT infrastructure 10 and/or clinicians of the patient information system 14 to access the EMRs and/or the medical data. As to the former, the components of the IT infrastructure 10 suitably access the EMRs and/or the medical data via the communications network 18. As to the latter, the clinicians suitably access the EMRs and/or the medical data via the user input device 30 and/or the display 32. When the clinicians access the medical data, a clock-wise module 34, as described above, is employed. In that regard, the time-specific values for the physiological parameters of the medical data are plotted on one or more clock faces, optionally as the medical data is received.

The patient information display systems 16 display medical data for one or more patients. In certain embodiments, patient information display systems 16 include portable devices, such as cell phones. To facilitate the display of medical data, the patient information display systems 16 receive medical data for the patients cared for by the medical institution. Typically, the medical data is received from other components of the IT infrastructure 10, such as lab equipment or patient monitoring systems, over the communications network 18. However, the medical data can be received from clinicians via, for example, one or more user input devices 36. Using the received data, the patient information display systems 16 update one or more displays 38 to graphically present the medical data to clinicians. Suitably, the medical data is presented to the clinicians using one or more clock-wise modules 40, as described above. In that regard, the time-specific values for the physiological parameters of the medical data are plotted on one or more clock faces, optionally as the medical data is received.

To carry out the above noted functionality, the patient monitoring systems 12, the patient information system 14, and the patient information display systems 16 suitably include one or more memories 28, 42, 44, one or more processors 46, 48, 50, and one or more communications units 52, 54, 56. The memories 28, 42, 44 store executable instructions for performing one or more of the above noted functions, including those functions associated with the clock-wise modules 26, 34, 40. The processors 46, 48, 50 execute the executable instructions stored on the memories 28, 42, 44 to carry out the functions. The communications units 52, 54, 56 facilitate communication between the processors 46, 48, 50 and the communications network 18.

Figure 2:
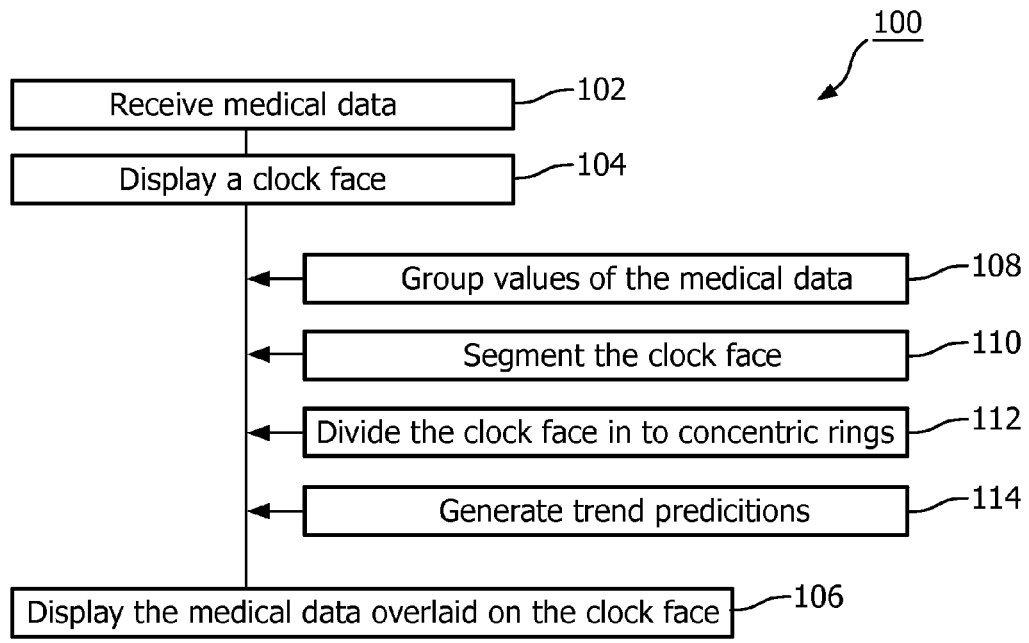
FIG. 2 is a block diagram of a method for intuitively representing medical data of a patient according to aspects of the present disclosure.

With reference to FIG. 2, a method 100 performed by the clock-wise modules 26, 34, 40 to intuitively represent medical data for a patient is provided. Medical data is received 102 from, for example, memories, user input devices, components of the IT infrastructure 10, sensors, and so on. Suitably, the medical data includes one or more time-specific values for one or more parameters, such as respiration rate, affecting the health or wellbeing of the patient. A clock face is further displayed 104 on a display, such as the display 32 of the patient information system 14. The clock face typically corresponds to a 12 hour clock, but can correspond to a 24 hour clock.

Figure 3:
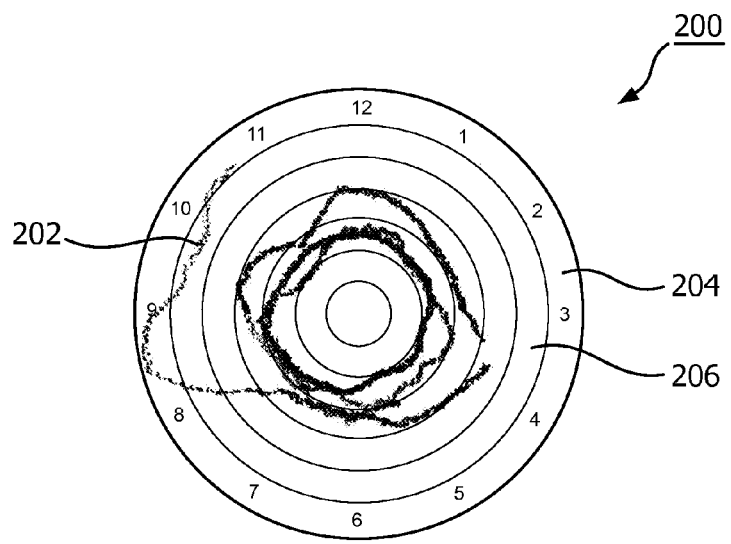
FIG. 3 is a sample clock representation of medical data.

The medical data is graphically displayed 106 overlaid on the clock face. In overlying the medical data, each of the values is plotted on the clock face according to its time and magnitude. Time for a value is represented as the position around the center of the clock face, and magnitude for a value is represented as its deviation from the center of the clock face. The time scale can be anything, such as minutes or seconds, but it is typically hours, days, or the like. Further, the magnitude scale depends upon the parameters. Suitably, each value is represented on the clock face by a marker, such as an 'x', 'o', and so on. However, in other embodiments, a line can trace the values. With reference to FIG. 3, an example clock representation 200 of medical data for respiration rate is provided. Markers 202 representing values of the medical data are overlaid on a clock face 204. The concentric rings 206 denote the magnitude of the values. The center or a pre-designated ring of the clock face 204 corresponds to zero breaths per minute and every consecutive ring is five breaths per minute more. The outer ring therefore corresponds to a respiration rate of 35.

Suitably, the medical institution employing the method 100 can tailor the parameters defining the behavior. It is contemplated that the medical institution can define one or more of the range of the magnitude scale, the number of values plotted, and so on. Further, it is contemplated that the parameters can be tailored to individual patients, medical wards, the medical institution as a whole, and so on. Even more, it is contemplated that the parameters can be tailored based on patient information from, for example, the patient information system 14.

In certain embodiments, the values are grouped 108 according to, for example, time period, parameter, and so on. For example, day time readings can be displayed in one color or marker and night readings with another. As another example, two physiological parameters can be displayed in different colors or with different markers. A time period is typically 12 hours or 24 hours, depending upon the type of clock face. For example, the time period is typically 12 hours for a 12 hour clock face and 24 hours for a 24 hour clock face. Where the values are grouped, the values are typically plotted so as to show the relation between group members. Such a relation can be shown through the use of marker color and/or marker style. For example, the same marker style can be used for values of a group, and different marker styles can be used for other groups. Even more, such a relation can be shown with lines tracing the values of the groups, where the line styles, color, and so on vary for each group. Further, such a relation can be shown by segmenting 110 the clock in the radial direction.

Figure 4:
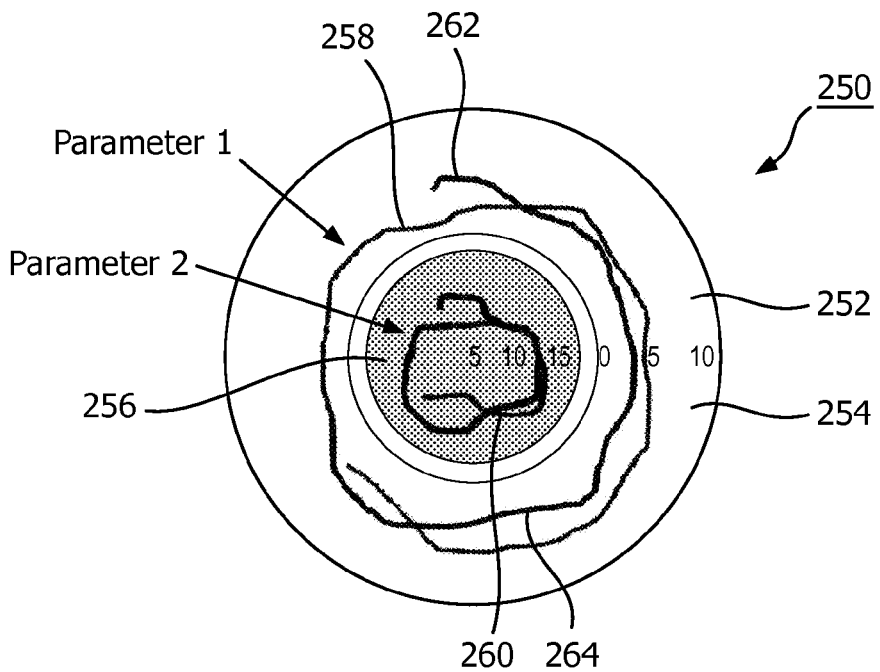
FIG. 4 is a sample clock representation of medical data employing radial segmentation.

With reference to FIG. 4, a clock representation 250 illustrating the display of multiple groups is provided. The medical data is grouped based on parameter for a first parameter and a second parameter, and, for each of these parameters, the medical data is further grouped in to a first 12 hour time period (9 am to 9 pm) and a second 12 hour time period (9 pm to 9 am). To display these four groups both segmentation and color coding are employed. A clock face 252 is segmented in to a first region 254 and a second region 256 in the radial direction. The first region 254 is employed for medical data of the first parameter and the second region 256 is employed for medical data of the second parameter. Within each region, a different color is employed for traces 258, 260 of medical data of the first time period and traces 262, 264 of medical data of the second time period. A light color is selected for the traces 258, 260 of the first time period to represent day time, and a dark color is selected for traces of the 262, 264 of the second time period to represent night time.

An advantage of representing medical data for multiple time periods in this way is that it allows for easy comparison of the different time periods. When two values for a given period do not coincide, it is easy to see there has been a change in the condition of the patient. Also differences between day and night are easily seen using the color coding of the above example. The clock representation gives a better feeling for the time scale on which changes occur.

Referring back to FIG. 2, in certain embodiments, the clock is divided 112 into a plurality of concentric rings, each ring representing a different magnitude. The backgrounds for these concentric rings are then varied to uniquely differentiate between the concentric rings. For example, a different color or pattern is applied to each of these concentric rings. Where colors are employed, the colors can be chosen to intuitively represent the state of the patient. For example, colors ranging from green (i.e., good) to red (i.e., bad) can be used to help a clinician better identify patient severity.

Figure 5:
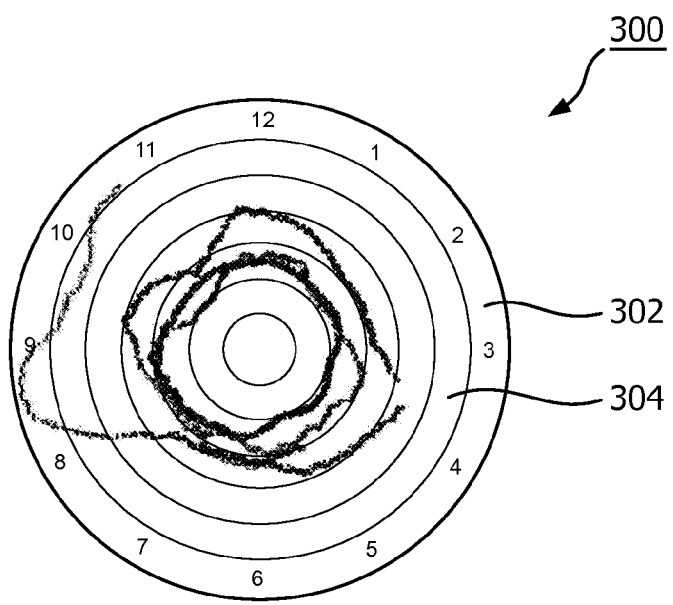
FIG. 5 is a sample clock representation of medical data employing background coloring.
Figures 6, 7:
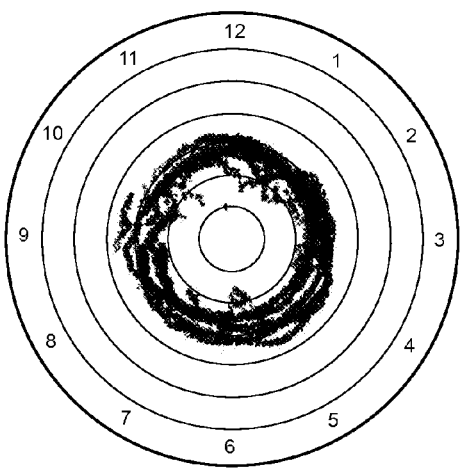
FIG. 6 is a table illustrative of a EWS scoring system.
FIG. 7 is a sample clock representation of medical data illustrating the affect of cluttering.

With reference to FIG. 5, a clock representation 300 illustrating the display of medical data using background coloring is illustrated. The medical data plotted on a clock face 302 includes EWSs for a EWS scoring system 350 shown in FIG. 6. The boundaries for the different scoring levels vary among hospitals. The clock face 302 is divided into concentric rings 304 based on each EWS scoring level from the EWS scoring system 350. These concentric rings 304 are then color coded so as to allow easy differentiation between EWS scoring levels.

Figure 8:
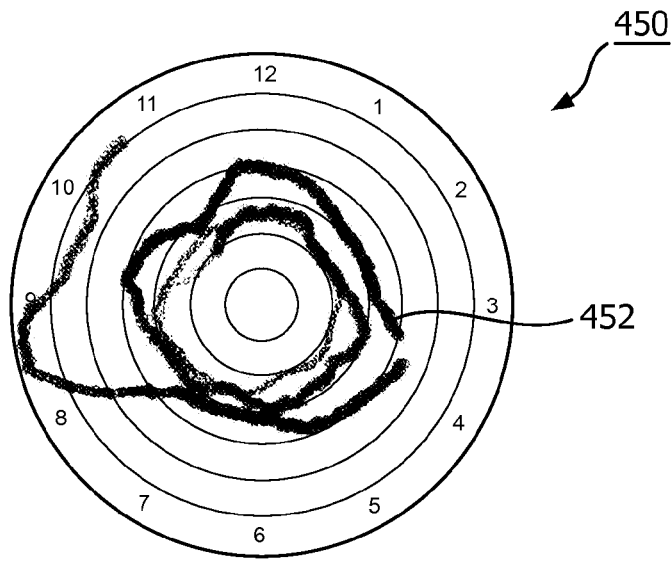
FIG. 8 is a sample clock representation of medical data employing larger markers for most recent medical data.
Figure 9:
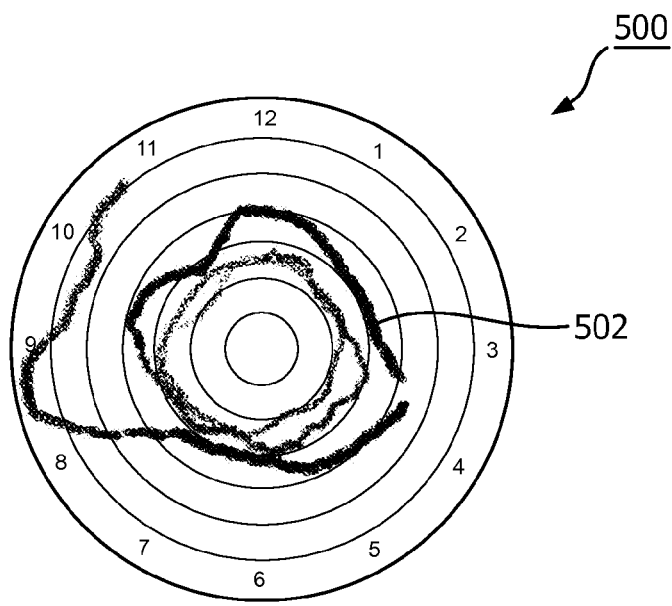
FIG. 9 is a sample clock representation of medical data employing a gradual decrease in marker size the farther back in time.
Figure 10:
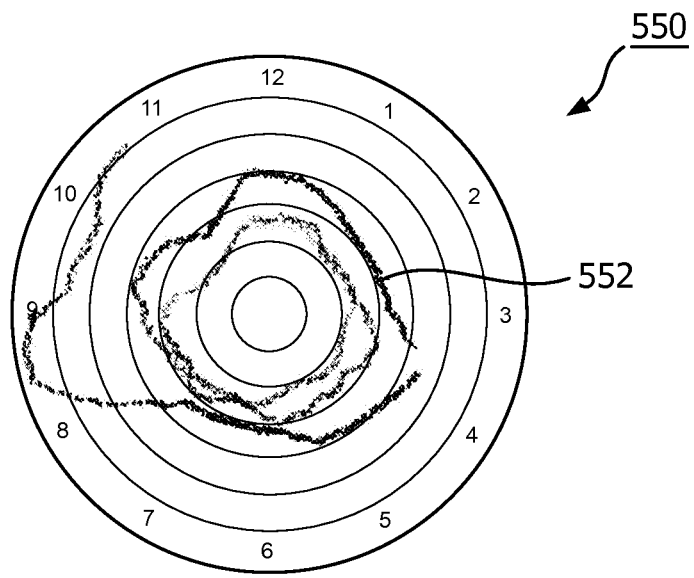
FIG. 10 is a sample clock representation of medical data employing a gradual fading of markers the farther back in time.
Figure 11:
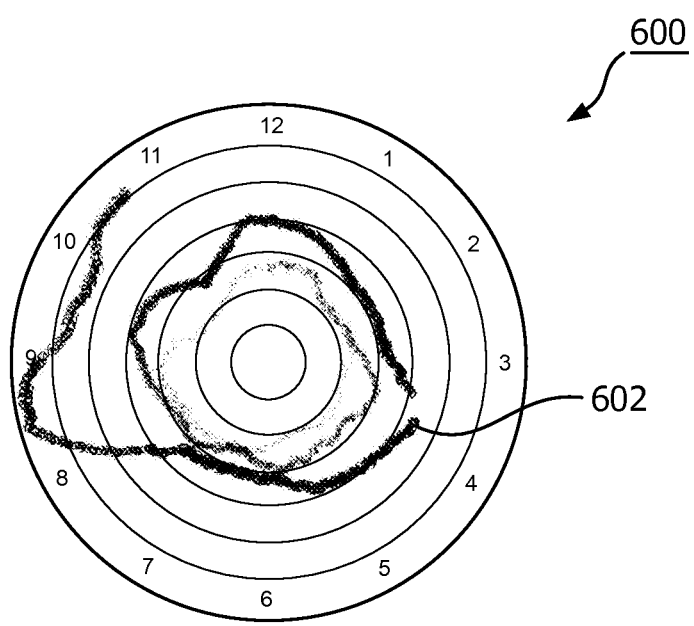
FIG. 11 is a sample clock representation of medical data employing a gradual decrease in marker size and fading of markers the farther back in time.

In certain embodiments, the markers and/or traces are augmented to improve the visibility of most recent data. This is advantageous when medical data for a patient spanning multiple days is plotted on a clock face, as is evident from the clock representation 400 of FIG. 7, since the clock representation can become cluttered. While one approach to alleviating the clutter is to limit the amount of medical data plotted, for example to a 24 hour period, such an approach limits the ability to compare medical data, e.g., todays and yesterdays. Other approaches which do not impose such limitations include enlarging the markers or trace widths for, for example, the last 24 hours of data (e.g., as done for markers 452 shown on a clock representation 450 of FIG. 8), gradually shrinking the markers or trace widths the farther back in time (e.g., as done for markers 502 shown on a clock representation 500 of FIG. 9), gradually fading the markers or trace widths the farther back in time (e.g., as done for markers 552 shown on a clock representation 550 of FIG. 10), and both gradually fading and shrinking the markers or trace widths the farther back in time (e.g., as done for makers 602 shown on a clock representation 600 of FIG. 11).

Figure 12:
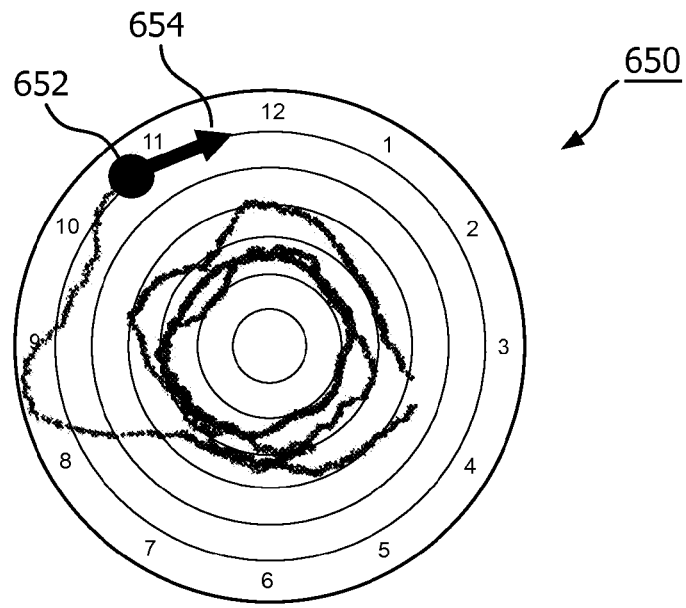
FIG. 12 is a sample clock representation of medical data employing a unique indicator to highlight most recent medical data and provide trend extrapolation.

Referring back to FIG. 2, in certain embodiments, a unique marker, such as a dot or arrow, is employed to represent the most recent medical data. Where the unique marker is an arrow, the arrow can be positioned to give a trend prediction for, for example, the next hour. In such embodiments, the method 100 includes generating 114 trend predictions for parameters of the medical data using a trending algorithm. With reference to FIG. 12, a clock representation 650 has an enlarged header 652 at the end of the line, the header 652 optionally including an arrow 654. The arrow 654 is positioned to give a trend prediction. Optionally, the header 652 causes an identification of the most recent medical data or the like.

Figure 13:
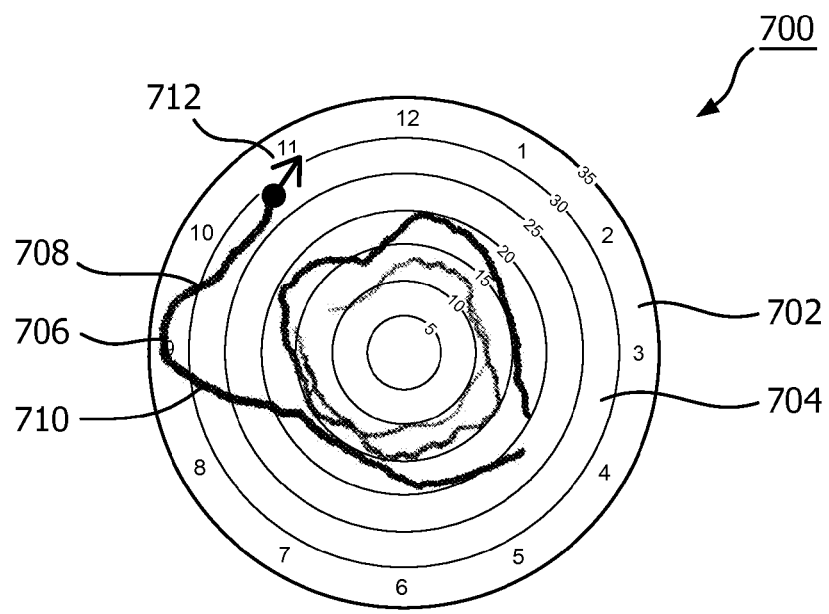
FIG. 13 is a sample clock representation of medical data.

With reference to FIG. 13, a clock representation 700 illustrating many of the features previously described. A clock face 702 is divided in to concentric circles 704, which are color coded according to severity. Medical data for respiration rate spanning more than a 24 hour period is plotted on the clock face 702 using markers 706. The medical data is grouped in to 12 hour periods, each 12 hour period spanning from 9 am to 9 pm or 9 pm to 9 am. Markers 708 for medical data falling in to the former are lightly colored to denote day, and markers 710 for medical data falling in to the latter is darkly colored to denote night. Further, the markers 706 indicating the medical data are gradually faded and shrunk the farther back in time, and the most recent medical data is indicated with an arrow 712 identifying a trend prediction.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), a field-programmable gate array (FPGA), and the like; a user input device includes one or more of a mouse, a keyboard, a touch screen display, one or more buttons, one or more switches, one or more toggles, and the like; and a display includes one or more of a LCD display, an LED display, a plasma display, a projection display, a touch screen display, and the like.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

Having thus described the preferred embodiments, the invention is now claimed to be:

1. A system for intuitively displaying medical data of a patient, said system comprising:
   a display; and,
   one or more processors programmed to:
      receive medical data for the patient, the medical data including one or more medical values for one or more parameters affecting the health or wellbeing of the patient;
      display the medical values on the display in which time is represented around a center and magnitude for a value is represented as deviation from the center;
      group the medical values into a plurality of groups based on parameter and/or time period, wherein the medical values are displayed so as to uniquely identify the groups; and,
      segment the display into a concentric ring for each of the groups, wherein the medical values are displayed only in their respective concentric ring and the concentric rings are not overlapping.

2. The system according to claim 1, wherein the display includes time markers peripherally around the display.

3. The system according to claim 2, wherein the display is divided circumferentially into temporal segments.

4. The system according to claim 1, wherein the medical values are displayed on the display as markers or traces, the markers or traces uniquely identifying corresponding groups for the medical values.

5. The system according to claim 1, wherein the backgrounds for the concentric rings are varied uniquely to differentiate between the concentric rings.

6. The system according to claim 1, wherein the display of the medical values encircles the center multiple times and includes at least one of:
   color coding markers or traces representing the medical values to indicate day or night;
   shrinking the markers or traces to indicate more distant times; and,
   fading the markers or traces to indicate more distant times.

7. The system according to claim 1, wherein a most recent value is displayed on the display as a marker or a leading end of a trace.

8. The system according to claim 7, wherein the processors are further programmed to:
   generate a trend prediction from the medical values, wherein the marker indicates the trend prediction.

9. The system according to claim 1, wherein the one or more medical values are for a plurality of 12-hour time periods, and wherein the groups include a group for each unique combination of parameter and time period.

10. The system according to claim 4, wherein the markers or traces are color coded to indicate whether corresponding medical values were captured during the day or at night.

11. A method for intuitively displaying medical data of a patient, said method comprising:
    receiving by one or more processors medical data for the patient, the medical data including one or more medical values for a plurality of parameters affecting the health or wellbeing of the patient and for a plurality of time periods;
    displaying a clock face on a display;
    grouping by the one or more processors the medical values into a plurality of groups based on parameter and time period, wherein the groups include a group for each unique combination of parameter and time period;
    segmenting by the one or more processors the clock face into a concentric ring for each of the parameters; and
    displaying by the one or more processors the medical values on the clock face in which time is represented around a center and magnitude for a value is represented as deviation from the center, wherein the medical values are displayed so as to uniquely identify the groups, and wherein the medical values are displayed only in their respective concentric ring and the concentric rings are not overlapping.

12. The method according to claim 11, wherein the display includes time markers peripherally around the display.

13. The method according to claim 11, further including:
    displaying medical values representing a plurality of patient parameters concurrently on the display.

14. The method according to claim 11, further including:
    grouping the medical values into a plurality of groups based on parameter and/or time period, wherein the medical values are displayed so as to uniquely identify the groups.

15. The method according to claim 14, further including distinguishing the groups by at least one of:
    color coding the different groups; and
    displaying the medical values as markers or traces, the markers or traces uniquely identifying corresponding groups for the medical values.

16. The method according to claim 11, wherein the display of the medical values encircles the center multiple times and includes at least one of:
    color coding markers or traces representing the medical values to indicate day or night;
    shrinking the markers or traces to indicate more distant times; and,
    fading the markers or traces to indicate more distant times.

17. The method according to claim 11, further comprising:
    generating a trend prediction from the medical values, wherein a most recent value is displayed as a marker, the marker indicating the trend prediction.

18. The method according to claim 11, wherein the plurality of time periods include a plurality of 12-hour time periods.

19. A non-transitory computer readable medium carrying software which controls one or more processors to perform the method according to claim 11.

* * * * *